United States Patent [19]
Hoffman

[11] 4,275,426
[45] Jun. 23, 1981

[54] FLOPPY DISC DRIVE

[75] Inventor: Paul R. Hoffman, Exton, Pa.

[73] Assignee: Exxon Research & Engineering Co., Florham Park, N.J.

[21] Appl. No.: 19,901

[22] Filed: Mar. 12, 1979

[51] Int. Cl.³ .................... G11B 5/016; G11B 5/54; G11B 25/04
[52] U.S. Cl. .................................... 360/99; 360/78
[58] Field of Search ............................. 360/99, 97–98, 360/86, 105, 133, 135, 78; 346/137; 310/49 R, 268, 263

[56] References Cited
U.S. PATENT DOCUMENTS

| | | | |
|---|---|---|---|
| Re. 29,380 | 8/1977 | Castrodale et al. | 360/99 |
| 3,500,363 | 3/1970 | Shill | 360/97 |
| 3,881,184 | 4/1975 | Koepcke et al. | 360/78 |
| 3,886,595 | 5/1975 | Swaim et al. | 360/78 |
| 4,146,912 | 3/1979 | Kukreja | 360/99 |

*Primary Examiner*—Alfred H. Eddleman
*Attorney, Agent, or Firm*—Norman L. Norris

[57] ABSTRACT

An improved floppy disc drive, with direct disc rotational drive, characterized by a step motor having a plurality of pole pairs with pole pieces fabricated from a portion of the drive housing at predetermined locations, and a disc having radial webs and positioned so that pairs of such radial webs align one pair at a time with successive ones of successively energized pole pairs, thereby providing a highly efficient and compact disc drive motor. The drive assembly also contains a read head drive with a step motor and transmission means for driving the read head radially with respect to the floppy disc. Means are provided which enable clutch operation to engage the disc with the drive only when the disc is properly seated within the drive assembly.

6 Claims, 6 Drawing Figures

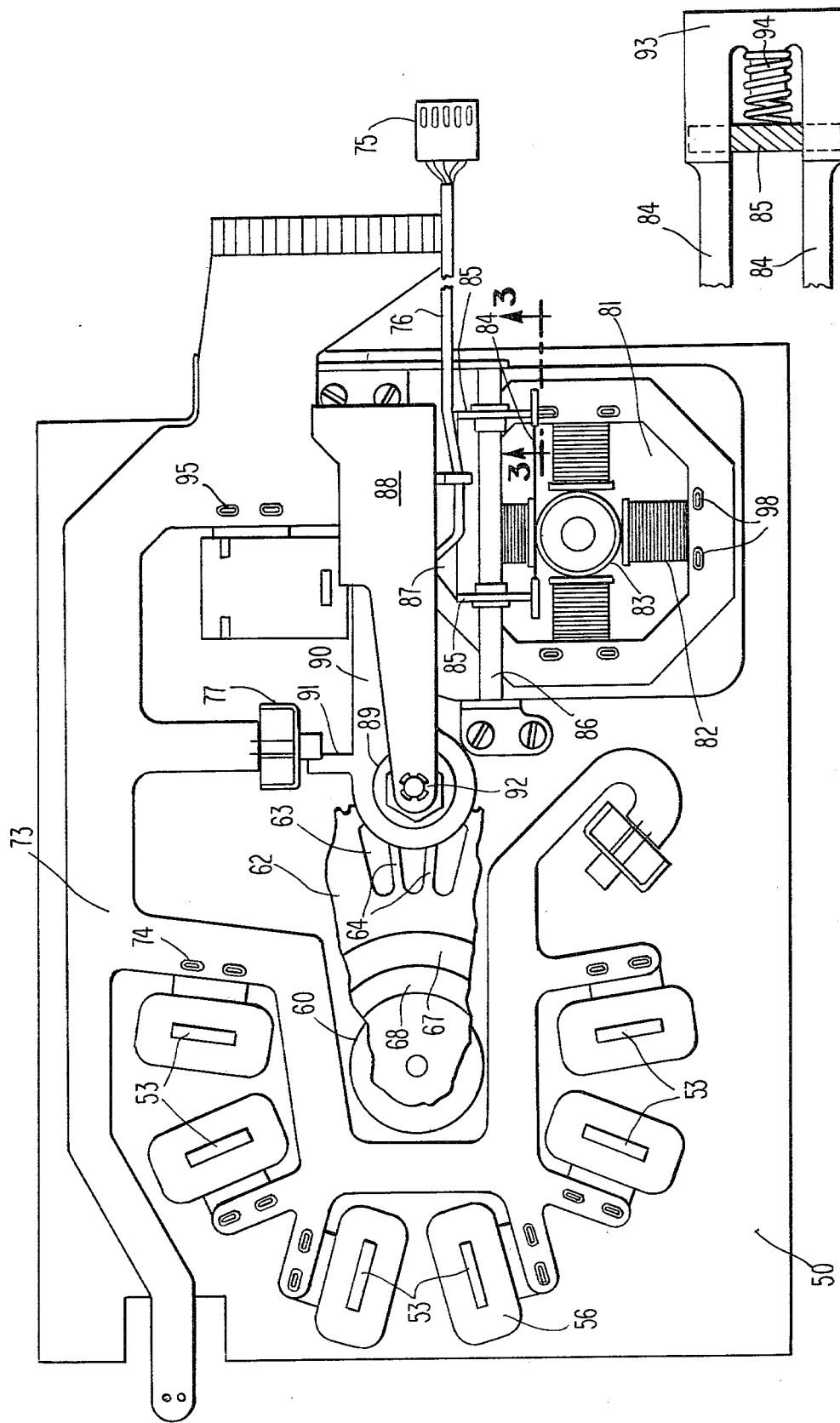
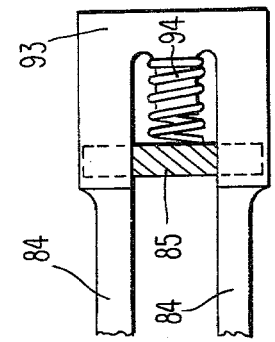

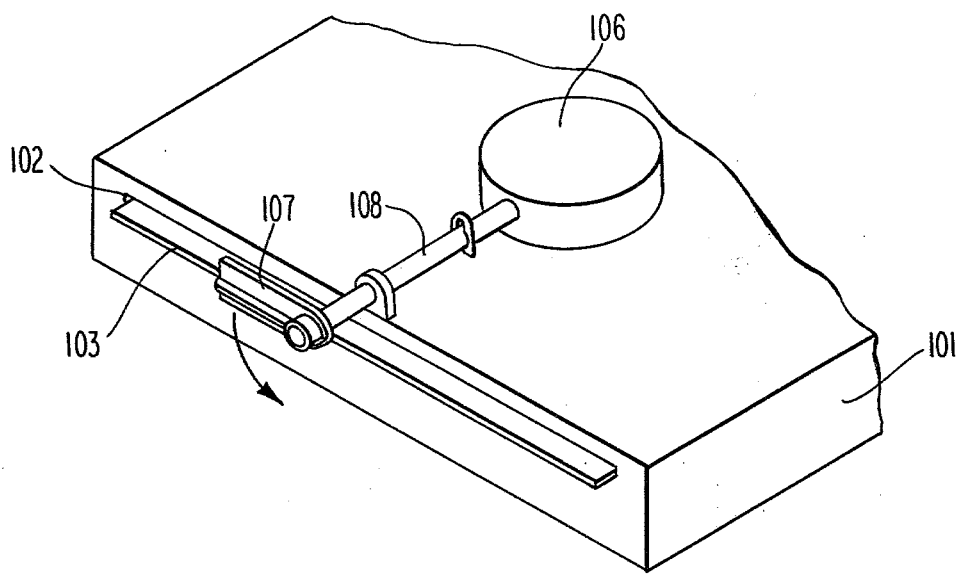
Fig. 4A
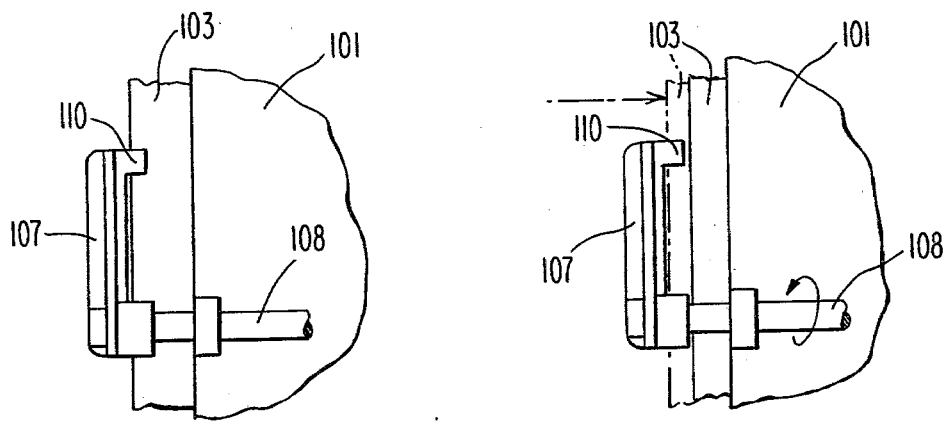
Fig. 4B                    Fig. 4C

FLOPPY DISC DRIVE

BACKGROUND OF THE INVENTION

This invention lies in the field of floppy disc drive systems and, in particular, a disc drive with a direct rotational step motor drive.

The floppy disc is now a widely accepted storage medium and in particular has become almost universally employed in office equipment and word processing devices. The floppy disc is a thin Mylar platter, either 8 inches in diameter in the standard size or 5¼ inches in diameter for the minifloppy. The smooth surface of the disc is coated with a magnetic oxide, and is housed in a square paper envelope having an opening or "window" through which the disc is exposed to the read-write head. Another smaller window provides access for detecting segment reference markings. The floppy disc can hold a substantial amount of information, and a standard 8 inch disc being capable of holding a megabite. Associated with the floppy disc is a disc drive which is required to rotate the disc at a specific speed and to provide automated control of the read and write operations. Every apparatus which uses the floppy disc must necessarily have the associated floppy disc drive. The drives are necessarily relatively complex and have been relatively expensive. In view of this, and also in view of the projection for substantially increased use of floppy discs in the near future, it is important to provide an improved floppy disc drive which is simplified, less expensive, and is capable of being packaged in a smaller volume.

SUMMARY OF THE INVENTION

It is an object of this invention to provide a floppy disc drive which is an improvement over prior art disc drives in terms of reduced complexity, reduced cost and smaller package volume.

It is another object of the invention to provide a direct rotational floppy disc drive having a disc type step motor.

It is another object of this invention to provide a simplified step motor of relatively flat thin construction for use in providing a rotational drive for a floppy disc drive or the like.

It is another object of this invention to provide a simplified step motor having an improved armature design.

It is another object of this invention to provide a floppy disc drive having a simplified step motor comprising pole pieces fabricated integrally with a housing plate of the disc drive housing.

It is another object of this invention to provide a floppy disc drive having an improved read head drive mechanism.

It is another object of this invention to provide a floppy disc drive having a disc motor characterized by having a relatively thin volume, and further having a disc housing designed to enable operation of the disc drive only when the floppy disc has been fully and properly entered into the drive.

In view of the above objects and others which are detailed in the disclosure, there is provided a floppy disc drive with a direct rotational step motor drive, characterized by a step motor having a plurality of pole pieces formed integrally with the base plate of the housing of the drive, and a disc armature having a predetermined number of radial web elements of a thickness corresponding to the pole pieces and mounted relative to the pole pieces to provide a step motor drive when the pole pieces are sequentially energized. The construction which utilizes pole pieces integrally formed from the base plate and the flat disc armature enables a simple, efficient and relatively thin motor construction for rotation of the floppy disc. The disc drive is also characterized by a read/write head drive utilizing another step motor and a spring loaded motor for positioning the read/write head. A unique clutch handle design prevents operation of the floppy disc drive except when the disc has been properly seated into the drive housing.

BRIEF DESCRIPTION OF THE DRAWINGS

FIG. 2 is a plan view in schematic form, showing the positioning of the floppy disc drive and the read head drive on the housing base plate.

FIG. 3 is a detailed view along lines 3—3 showing the spring loaded feature of the transmission means for coupling the read head motor with the read head assembly.

FIG. 4A is a perspective view showing the floppy disc housing and the floppy disc entered therein, and the relationship of the clutch handle to the front edge of the floppy disc which has been inserted into the disc drive. FIG. 4B is a detailed view showing the relationship of the clutch handle to the floppy disc when it has not been fully entered into the disc drive assembly. FIG. 4C is a detailed view showing the relationship of the clutch handle to the floppy disc when it has been fully inserted into the disc drive assembly.

DESCRIPTION OF THE PREFERRED EMBODIMENTS

Figure 1:
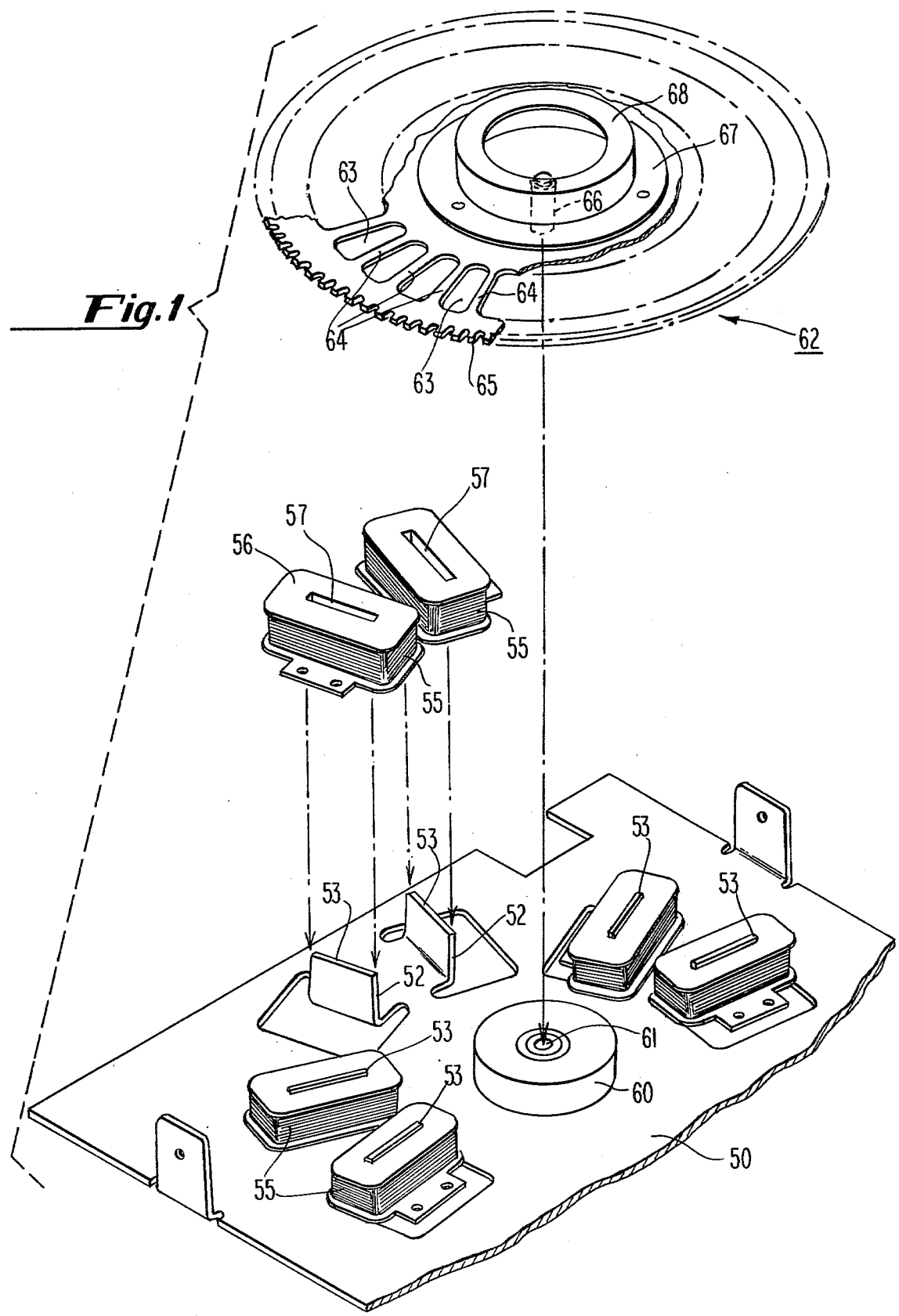
FIG. 1 is a split perspective view of the floppy disc drive, showing a motor stator formed of coil elements interfitted with pole pieces which are formed integrally with a base plate of the disc drive housing, and a disc armature having radial openings therein designed to provide webs spaced in predetermined relation to the pole pieces, to provide a step motor.

Referring now to the drawing, FIG. 1 shows the base plate 50 of the overall disc housing, and motor disc 62, with the relationship of the base plate and disc being indicated. Base plate 50 is made of ferrous material and has tabs 52 assembled therefrom by cutting the plate and bending them as shown. For the three pole pair motor of the preferred embodiment of this invention, there are three pairs of pole pieces 52, each of which has associated therewith a coil element 55. Coil element 55 comprises a substantially rectangularly wound coil with a bottom insulating piece and a top insulating piece 56 having a substantially rectangular slot 57. When coil element 55 is dropped onto pole piece 52, the upper edge 53 of pole piece 52 extends through the inner cavity of the coil 55 and just through rectangular opening 57. As shown, these three pole pairs are placed radially about a center hub 60 which has an axial receiving opening 61 at the center thereof for receiving pin 66 on the bottom of disc 62. The remainder of the housing is conventional, and provides for positioning the disc to be rotated and to be in proper registration with the read/write head.

The armature disc, as shown generally at 62, comprises a flat disc portion having radial openings 63 spaced to provide radial webs 64 therebetween. The webs 64 are positioned so that one pair of them at a time can align exactly with one pair of pole pieces 53. That is, the number and the spacing of opening 63 is such that only one pair of webs (not adjacent in the illustration of FIG. 2) aligns with, or is in registration with a given pair of pole pieces 53 at any time. Thus, in practice, with the disc 62 mounted and centered with respect to the pole pieces, a single pair of webs 64 may align precisely with a pair of pole pieces 53. The pair of pole pieces with which the disc is aligned will be that pair which has its corresponding coils 55 energized, according to well known principles. If such coil pair is then deenergized, and the next pair of coils is energized, the disc is caused to rotate so that a pair of webs 64 aligns with the pole pieces 53 of the next pole pair. In this way, the disc can be continually rotated by sequentially energizing successive coil pairs 55, causing successive alignment with respective pairs of pole pieces 53.

Continuing with the detail of FIG. 1, armature disc 62 has mounted thereon a plate 67 which carries a concentric elevated drive ring 68, against which the floppy disc is caused to be pressed when the disc drive clutch is engaged. The clutch mechanism is a conventional mechanism as utilized in floppy disc drives, and accordingly is not described. The axial pin 66 which extends downward from the bottom surface of disc 62 is positioned to be seated in the bearing 61, for center mounting of the disc relative to the pole pieces. Other details of the motor and the motor control, whereby the pole pieces are successively energized, are not disclosed since these are well known in the art. The important feature is the construction whereby the pole pieces are individually formed from the base plate 50, and are spaced relative to the center opening 61 so as to provide step-motor type registration with the webs 64 of the disc, thereby enabling step motor operation.

Disc 62 has, along its outer periphery, timing teeth, or notches 65. As illustrated, there are a plurality of notches for each web. A photodetector 76, shown in FIG. 2, is positioned to detect each notch, and basic control signals are generated from each such detected notch. In the preferred embodiment, each time a notch is detected, the motor control is stepped and a next pole pair is energized. Thus, for every third notch of rotation a given pole pair is energized. For a total of n notches around the disc, each pole pair is energized n/3 times per disc revolution.

Referring now to FIG. 2, there is shown a diagram which indicates the positioning of the read head drive relative to the disc drive. A flat ribbon type connector 73 is positioned on the base plate 50 to provide circuit connections to the motor and detector locations which require electric coupling. For example, terminals 74 are provided for energization of each coil 55, as controlled by a conventional sequencing control. Connections are also shown to photocell detectors 76 and 77. Only a portion of the disc 62 is shown for purposes of illustration, the important point being that the webs 64 have radial lengths which correspond precisely to the radial length of pole pieces 53, such that at any time a given pair of webs 64 can register exactly with a given pair of pole pieces 53.

Seen in the lower right hand portion of FIG. 2, there is another step motor 81 illustrated as having four pole pieces 82 and corresponding connection points 98. The rotor 83 has longitudinal notches, not shown, and an upper pulley portion which is in friction contact with a spring 84 which is tightly held at each end by elements 85. Elements 85 in turn ride on fixed axle 86, and carry coupling member 87 which in turn carries upper read head member 88 and lower read head member 90 which are attached thereto. Members 88 and 90 are connected to connector 75. The rotational movement of rotor 83 is translated into horizontal movement by spring loaded member 84, thereby carrying the upper and lower read head members back and forth radially with respect to the floppy disc (not shown in FIG. 2), for positioning of the read head relative to the many tracks thereof. Motor 81 operates at 100 steps per revolution, but since only 40 steps are used, the rotor is required to make 4/10 of a turn in order to provide the desired radial movement of the read head. It is to be noted that the floppy disc, when entered into the total assembly, is positioned between a circular disc 89 which is at the end of member 90 and which carries the read head, and upper arm 92 at the end of member 88, which carries a felt pad. An electromagnet assembly, indicated at 100, is energized to push the pad against the floppy disc which in turn is pressed into contact with the read head, whenever the reading or writing operation is desired. The electrical connections to and from the read head are carried by the wires designated at 76, which connect to connector element 75 as shown.

Turning to FIG. 3, there is a detail view of the means of maintaining spring loaded contact between spring 84 and pulley 83. Band 84 terminates, at the right hand end as seen in FIG. 2, in a U-shaped section 93 which extends beyond element 85, and has a center portion which carries a spring 94. Spring 94 maintains band 84 in an extremely tight condition, so that it is at all times maintained in good frictional contact with the upper pulley portion of rotor 83.

Referring now to FIGS. 4A-4C, there is illustrated the clutch handle arrangement of this invention which ensures against clutch engagement of the floppy disc unless the floppy disc is fully and properly seated within the disc assembly 101. The clutch, indicated at 106, is a conventional clutch which contains a conical member (not shown) which seats down into the central opening of the floppy disc and causes it to be pressed into contact with drive ring 68 of the disc. The clutch is operated by a handle 107, seen in FIG. 4A, which connects to clutch 106 through an axle 108 and an appropriate camming mechanism not shown. The handle, which at the 9 o'clock position (shown in FIG. 4A) is above the disc, can be rotated downward for clutch engagement only if the disc 103 is fully inserted into the opening 102, such that the disc is properly centered. As shown in FIG. 4B, if the disc 103 is not fully inserted, the forward extended portion 110 of handle 107 does not clear the disc, and clutch engagement is not possible. As seen in FIG. 4C, when the disc has been fully inserted, portion 110 clears the proximal edge of the disc, enabling rotation of the handle and clutch engagement.

Another unique feature is the means of detecting when the read head is positioned in registration with the zero track of the floppy disc. Read head member 90 (FIG. 2) carries an outward extension 91 which intercepts fixed photodetector 77 when and only when the read head is positioned over the zero track. The detector output is carried through connector 73 to the electronic control board (not shown) so that the drive always shows when the read head is positioned at the zero track.

In operation, there is provided a highly efficient and relatively compact disc drive. The disc drive motor assembly enables a thinner motor than previously available, when reduced the size of the overall drive package. Construction is also simplified, resulting in less expense.

What is claimed is:

1. A floppy disc drive assembly, with direct rotational drive, the drive assembly being contained within a housing, characterized by:

a step motor comprising a base plate which is a portion of such housing, such plate having a plurality of pairs of tabs integral therewith;

a plurality of fixed pole pairs, each pole including a coil surrounding one of said tabs such that said tabs form pole pieces;

means for controlling the energization of said coils;

receiving means on said base plate centrally located relative to said pole pairs;

a disc armature mounted in and rotatable in said receiving means, said disc having a predetermined number of radial web elements of dimensions corresponding to that of said pole pieces, and at predetermined angular positions;

the relative positions of said pole pairs and said disc armature webs being such that only a pair of said webs is in registration with only a pair of said pole pieces at a time, whereby sequential energization of said poles enables operation of said motor.

2. The floppy disc drive assembly as described in claim 1, wherein said step motor comprises three pole pairs, and said disc comprises radial openings which define said radial web elements therebetween toward the outer periphery of said disc.

3. The floppy disc drive assembly as described in claim 2, wherein said webs are arranged relative to said pole positions such that as successive pole pairs are energized, there are equal successive incremental movements of said disc.

4. The floppy disc drive assembly as described in claim 3, wherein said tabs which form said pole pieces are constructed of ferrous material.

5. The floppy disc assembly as described in claim 1, wherein said armature disc carries a drive ring integrally attached thereto, and comprising means for driving a floppy disc by holding it in contact with said drive ring.

6. The floppy disc drive assembly as described in claim 1, comprising a recording read head assembly mounted on said base plate in position to read data on a floppy disc driven by said step motor.

* * * * *